(No Model.) 3 Sheets—Sheet 1.
H. MÜLLER.
DYNAMO ELECTRIC MACHINE.
No. 331,726. Patented Dec. 1, 1885.
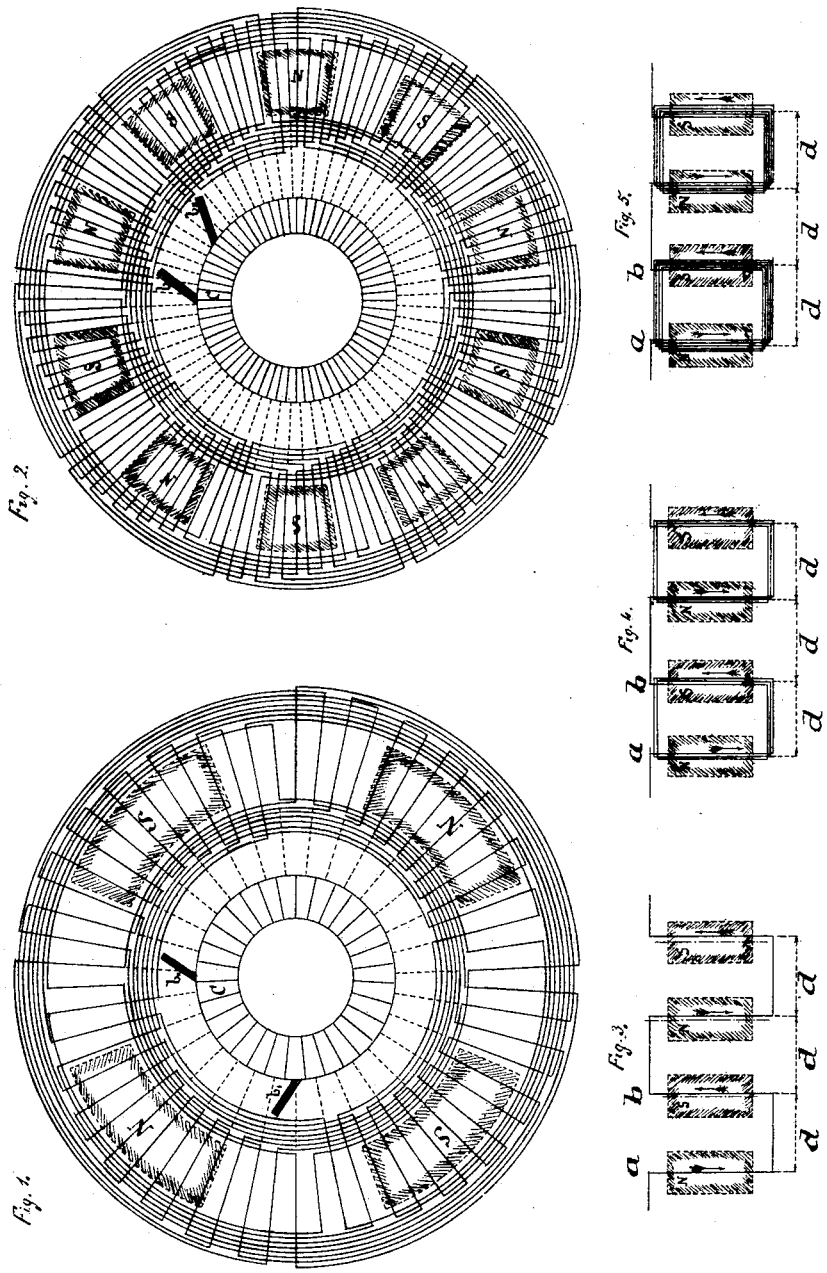

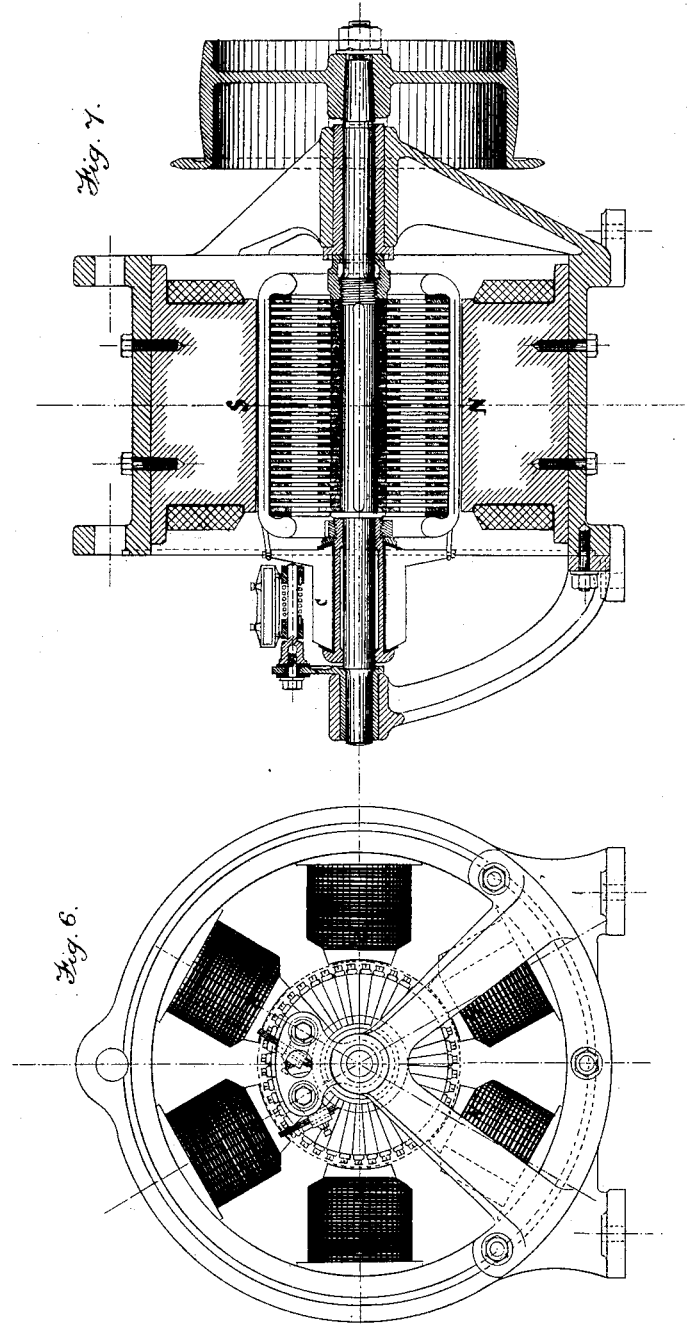

(No Model.) 3 Sheets—Sheet 3.
H. MÜLLER.
DYNAMO ELECTRIC MACHINE.
No. 331,726. Patented Dec. 1, 1885.
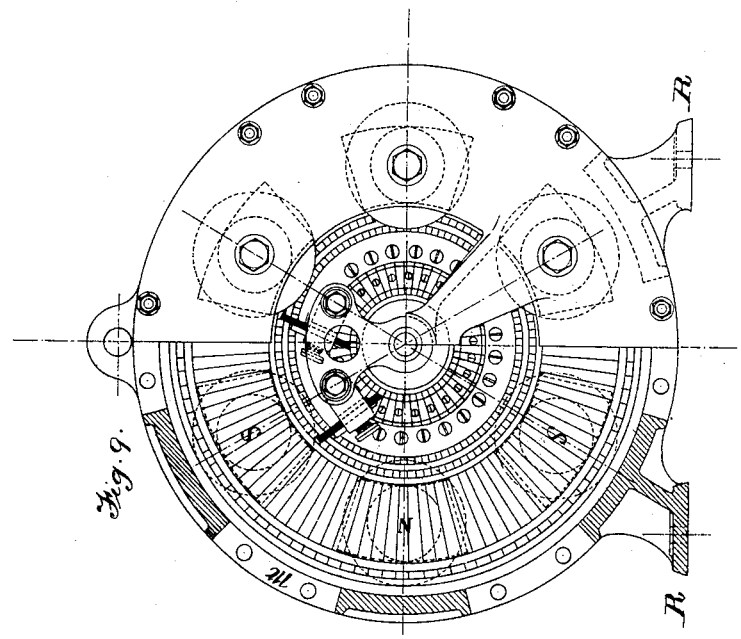
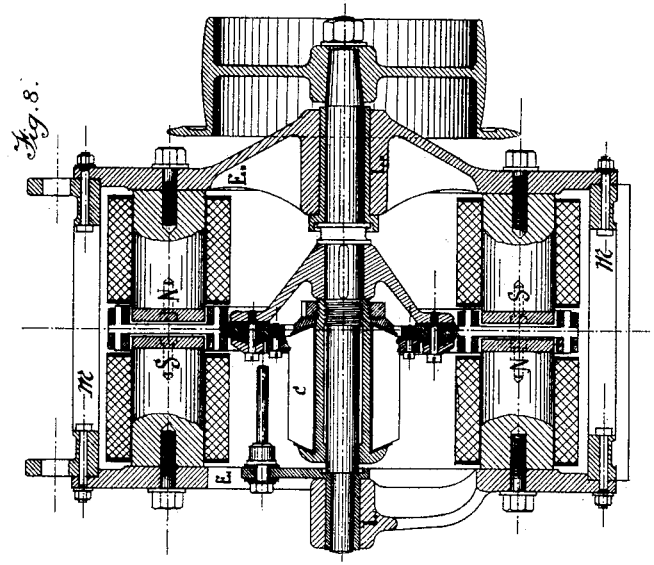
Witnesses,
C. J. Bell
Job Barnard.
Inventor,
Hermann Müller.
By Paine & Ladd,
Atty's.

UNITED STATES PATENT OFFICE.

HERMANN MÜLLER, OF ZURICH, ASSIGNOR TO THE WERKZEUG UND MASCHINENFABRIK OERLIKON, OF OERLIKON, NEAR ZURICH, SWITZERLAND.

DYNAMO-ELECTRIC MACHINE.

SPECIFICATION forming part of Letters Patent No. 331,726, dated December 1, 1885.

Application filed July 3, 1885. Serial No. 170,613. (No model.)

*To all whom it may concern:*

Be it known that I, HERMANN MÜLLER, a citizen of Winterthur, residing at Zurich, in the canton of Zurich and State of Switzerland, have invented certain new and useful Improvements in the disposition of the conductor system of multipolar dynamo-machines and its practical application; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to multipolar dynamo-electric machines; and it consists in the detailed construction of the armature and conductors, as hereinafter fully described and claimed.

In the drawings, Figure 1 is a diagram showing the arrangement of the conductors and commutator with four magnetic fields of alternating polarity. Fig. 2 is a diagram showing the arrangement of the conductors and commutator with ten magnetic fields of alternating polarity. Fig. 3 is a diagram showing the motion of the induced parts of the conductors relative to the axes of the poles. Figs. 4 and 5 are also diagrams showing the motion of more complex systems of induced parts relative to the axes of the poles. Fig. 6 is an end view of a cylindrical dynamo having its armature constructed according to this invention. Fig. 7 is a longitudinal vertical section through the center of the same. Fig. 8 is an end view, partly in section, of a disk-dynamo having its armature constructed according to this invention. Fig. 9 is a longitudinal vertical section through the center of the same.

Similar letters of reference indicate corresponding parts in all the figures.

The conductors in the armature form one continuous course having branches leading off to the commutator or collector C, and the induced current flows through the entire system when the armature is revolved in connection with the poles of the field-magnets N and S.

In the more complex forms the principle of the system remains the same as in the simple form, as shown in Figs. 1 and 3. The induced current flows from brush $b'$ to brush $b''$ through the whole system of conductors in such manner that however simple or complex the system of conductors may be, the average value of the distance $d$ between every two induced parts $a$ and $b$, which follow next to one another, always conforms to the condition $$1 \text{ - - - - - - - - - } d = \frac{u(1 \pm 1)}{p \quad n}$$

when $u$ = average circumference of armature. $n$ = number of segments of the collector C. $p$ = any equal number of field-magnets not less than four.

The collector C is made, as usual, of a number of insulated metallic segments, which are connected with the elements of the continuous conductor of the armature, as shown by the dotted lines in Figs. 1 and 2. Supposing the circumference $u$ to be divided into a number of equal parts $= n$, and that $\frac{1}{n}u = 1$, then it follows that $u = n$, and equation 1 takes the following form:

$$2 \text{ - - - - - } d = \frac{n \pm 1}{p}$$

and from this $$3 \text{ - - - - - } n = d.p. \mp 1.$$

From these equations it follows that for each circumferential progression or advance $d$ of the conductor elements $a\,b$ (of simple or complex form) a successive displacement takes place relatively to the axes of the magnetic fields, as shown in Fig. 3, and that this displacement may either be a lead or a retrogression, as preferred. The circumferential distance between two succeeding field-magnets being equal to $\frac{u}{p}$ or $\frac{n}{p}$, the average value D of the displacement (lead or retrogression)

will therefore be for each progression or advance of $ab$ $$4 \text{ ------- } D = d - \frac{n}{p}$$

and substituting herein the value of $d$ from equation 2, we get $$5 \text{ ------- } D = \pm\frac{1}{p},$$

so that after $p$ progressions the total lead or retrogression will be $$6 \text{ ------- } pD = \pm 1.$$

The conductors of an armature constructed or wound according to the laws laid down in the foregoing equations will result in an endless or continuous system of conductors which, when rotated in the magnetic fields of any equal number of magnets not less than four, will produce a continuous electrical current.

In Figs. 6 and 7 an armature constructed as hereinbefore described is shown applied to a cylindrical dynamo-machine.

In Figs. 8 and 9 the armature is shown applied to a disk-machine in which the main frame consists of a cylindrical shell, M, having holding-down lugs or feet R R.

E′ and E″ are removable end plates, to which the field-magnets N and S are attached. E′ has the bearing L′ for the driving-shaft formed integral with it. E″ has the bearing L″ for the driving-shaft formed integral with it also.

C is the commutator or collector.

Having thus described my invention, what I claim as new, and desire to secure by Letters Patent, is—

In a multipolar dynamo-machine, an armature having the conductors wound upon it in one continuous course, so that the distance between each two successive induced portions of the conductors is greater or less than that between the poles of the field-magnets according to the formula $$D = d - \frac{n}{p} \text{ or } D = \frac{n}{p} - d,$$

substantially as set forth.

In testimony whereof I affix my signature in presence of two witnesses.

HERMANN MÜLLER.

Witnesses:
CHARLES BROWN,
WILLIAM SCHNEIDER.